United States Patent [19]

Szegvari

[11] 4,224,354
[45] * Sep. 23, 1980

[54] METHOD FOR MAKING CHOCOLATE AND CHOCOLATE FLAVORED MATERIALS

[75] Inventor: Andrew Szegvari, Akron, Ohio

[73] Assignee: Union Process International, Inc., Akron, Ohio

[ * ] Notice: The portion of the term of this patent subsequent to Dec. 21, 1993, has been disclaimed.

[21] Appl. No.: 944,740

[22] Filed: Sep. 22, 1978

Related U.S. Application Data

[63] Continuation of Ser. No. 751,913, Dec. 17, 1976, abandoned, which is a continuation-in-part of Ser. No. 468,270, May 10, 1974, Pat. No. 3,998,938, which is a continuation-in-part of Ser. No. 387,354, Aug. 10, 1973, abandoned, which is a continuation-in-part of Ser. No. 360,466, May 15, 1973, abandoned, which is a continuation-in-part of Ser. No. 166,421, Jul. 27, 1971, abandoned.

[51] Int. Cl.$^2$ .......................... A23G 1/00; A23G 1/10
[52] U.S. Cl. ................................... 426/584; 426/593; 426/631; 426/518
[58] Field of Search ............... 426/631, 593, 659, 660, 426/518, 519, 237, 594, 584; 241/27, 29; 99/483

[56] References Cited

U.S. PATENT DOCUMENTS

| | | | |
|---|---|---|---|
| 3,149,789 | 9/1964 | Szegvari | 241/27 |
| 3,204,880 | 9/1965 | Haller | 241/29 |
| 3,395,020 | 7/1968 | Chozianin et al. | 426/237 |
| 3,506,461 | 4/1970 | Noschinski et al. | 99/483 |
| 3,628,965 | 12/1971 | Nijkerk | 426/518 X |
| 3,998,938 | 12/1976 | Szegvari | 241/29 X |

*Primary Examiner*—David M. Naff
*Attorney, Agent, or Firm*—Reed, Smith, Shaw & McClay

[57] ABSTRACT

A method is provided for making chocolate and chocolate flavored materials. A pump means repeatedly circulates a liquid continuum containing chocolate solids through conducting means to comminuting means formed of a bed of agitated grinding elements where the solids are comminuted, and through conducting means back to the pump means at a rate of at least about 30 and preferably between 50 and 500 volumes of liquid continuum containing solids in the comminuting means per hour. Chocolate and chocolate flavored materials having substantially greater particle size uniformity and other superior and unique properties are thus produced. Also in processing, the temperature is controlled during processing to liberate undesirable components, such as acetic acid, from the composition while retaining other desired components.

48 Claims, 5 Drawing Figures

METHOD FOR MAKING CHOCOLATE AND CHOCOLATE FLAVORED MATERIALS

RELATED APPLICATIONS

This application is a continuation of application Ser. No. 751,913, filed Dec.17, 1976, now abandoned, which is a continuation-in-part of copending application Ser. No. 468,270, filed May 10, 1974, and matured into U.S. Pat. No. 3,998,938 which is a continuation-in-part of then copending application Ser. No. 387,354, filed Aug. 10, 1973, now abandoned which is a continuation-in-part of then copending application Ser. No. 360,466, filed May 15, 1973, now abandoned which is a continuation-in-part of then copending application Ser. No. 166,421, filed July 27, 1971 now abandoned.

FIELD OF THE INVENTION

This invention relates to a method for comminuting particulate solids, and particularly chocolate and chocolate flavored compositions in a liquid continuum.

BACKGROUND OF THE INVENTION

Various methods and apparatus have been known for grinding particulate solids in a liquid media. They include ball mills, pebble mills, roll mills, sand mills and agitated-media mills. Illustrative art is believed to be U.S. Pat. Nos. 1,577,052, 2,764,359, 3,903,191, 3,008,657, 3,131,875, 3,298,618, 3,149,789, 3,204,880, 3,337,140, 3,432,109, 3,591,349, British Pat. Nos. 716,316 and 1,038,153, and German Pat. Nos. 1,214,516 and 1,233,237.

An agitated-media comminuting apparatus commutes the solids in liquid suspension by subjecting them to generally random contact in a bed of agitated grinding elements. In an agitated-media comminuting apparatus, the grinding is usually performed in a vertical cylindrical stationary tank or vessel with a rotatable agitator disposed on a substantially vertical axis. The agitator has one or more solid protuberances such as arms or discs extending out from the axis thereof into a mass of grinding media or elements such as pebbles, ceramic balls or metal balls that occupies a substantial portion of the vessel. The rotation of the protuberances through the mass of grinding media causes the media to occupy an increased apparent volume with the result that the grinding elements have a substantial free space between them and impinge on each other in a manner somewhat similar to the classic model of a gas. The particulate material to be ground and the liquid, which serves as a carrier and dispersing media for the material, occupy the spaces between the grinding media. The material is ground by the action of the agitated grinding media. A built-in pumping action may be used to maintain circulation within the comminuting means during comminution.

It has been recognized that more mass of material may be comminuted when the size of the comminuting vessel is increased. Agitated-media apparatus of larger size are, however, relatively more expensive to build and operate. It has also been recognized that the large capital outlay for larger size equipment could be avoided by recycling the suspended solids in the liquid continuum between a comminuting means and a large storage tank, see, e.g., U.S. Pat. No. 3,204,880. Recycling has been, however, generally regarded to result in increased grinding time to reduce the particles to a predetermined size. Such recycling operation results in large particles appearing in the final product without having been subjected to a sufficient amount of grinding.

The present invention claimed in the parent application overcomes these difficulties and disadvantages of the prior art above described. It has been found, contrary to what would be expected, that recycling at relatively high flow rates results in reduced grinding times. It would be expected that the grinding time in a recycling operation would never be as short as the grinding time for the same batch of material ground in a grinding means equal in volume to the retaining tank plus the comminuting means without recirculation, or to a series of grinders equal in total volume to the volume of the retaining tank and comminuting means without recirculation. However, applicant has found that, surprisingly, the grinding time for a given batch reduces with relatively high recirculation rates to less than the time to grind the same batch in a single grinding means, or a series of grinders equal in volume to the retaining tank plus comminuting means. The processing capacity of a given size grinding apparatus is thereby increased without the necessity for relatively large and expensive grinding apparatus. The present invention claimed in this application is directed specifically to the processing of chocolate where the invention has special application and advantages.

Chocolate Making: Chocolate is made by comminuting and mixing various compositions of chocolate solids in a liquid continuum. After winnowing, the nib is ground to produce cocoa mass or chocolate liquor (sometimes called "bitter chocolate"), from which cocoa butter can be extracted by pressing. On cocoa butter production, the press cake is pulverized to produce cocoa powder. The extracted cocoa butter is used in the preparation of chocolate by incorporating it into a mixture of sugar and nib and/or chocolate liquor to produce sweet chocolate (sometimes called "plain chocolate"), and into a mixture of sugar, milk powder and nib and/or chocolate liquor to produce milk chocolate (called "milk chocolate").

Chocolate Liquor: The nib is a cellular mass containing about 55 percent cocoa butter (i.e., cocoa fat) locked within the cell structure. When the cell walls are ruptured during comminuting, the fat is released and, as it is liquified by the frictional heat, it becomes a continuous phase in which the disintegrated cell particles (i.e., chocolate solids) are suspended. As disintegration proceeds, more and more fat is liberated, reducing the viscosity of the paste until it becomes a fluid which is referred to as chocolate liquor (or cocoa mass).

A variety of grinding devices have to be used to perform the grinding and mixing in the various stages of chocolate making. For chocolate liquor production, originally circular stone mills consisting of typically three sets of horizontal double stone plates were widely used; in each set, one stone was held stationary while the other is rotated in close contact with it, and the materials to be ground are fed through the center opening and passed to and collected at the outer periphery. The grinding action was improved by cutting grooves in the stones to distribute and regulate the feed. These machines have been replaced in many plants by steel disc mills, with the discs mounted either horizontally or vertically, and with a central steel disc rotating at high speed between two stationary steel faces, all of which are suitably grooved; the material to be ground is again fed to the center of the discs and passed to and collected at the outer periphery. Chocolate liquor is also commercially processed by cylindrical four- and five-steel roll refiners. In any case, the control of the size and uniformity of the chocolate solids in the liquor (as well as processing temperature, discussed below) is critical to further processing and taste and appearance of the final chocolate liquor product.

The comminuting of chocolate liquor generates considerable heat and temperature can rise to 105°–110° C. The frictional heat generated during comminution will defeat the purpose of light roasting for sweet chocolate production; therefore, water cooling is generally provided on the steel disc mills and comminuting devices. In this manner, by controlling the comminuting rate and the cooling, the chocolate liquor temperature can be controlled during comminution and generally maintained between 100° and 220° F. During the grinding stage, no chemical changes are desired or generally involved, although there may be some loss of moisture and acetic acid vapor from the mass.

Cocoa Butter and Cocoa Powder: The fineness and uniformity of the chocolate solids in the liquor is also very important in all chocolate products, although more important in making some chocolate products then in making others. Where the liquor is used directly in making sweet or milk chocolate, fineness and uniformity of particle size is not as important because of the subsequent processing involved during refinement with sugar particles, or sugar and milk particles. For cocoa powder or cocoa butter production, it is, however, desirable to have the chocolate solids of the liquor as fine and uniform as possible. This provides the maximum, controlled amount of the cocoa butter in free state, for efficient extraction of the butter. Fineness and uniformity of the particles is also necessary to facilitate dispersion and provide taste and color to the cocoa powder where the powder is used for production of products such as beverages, pudding mixes, ice cream, syrups and sauces. The particle size of the chocolate solids in the liquor during production are generally measured by micrometer measurement, by test sieving, and by sediment methods.

Cocoa powder is produced from the chocolate liquor by removing from it some of the cocoa butter, generally by hydraulic pressing, and grinding and pulverizing the resulting press cake. The preparation of cocoa powder from the press cake involves several factors not usually associated with grinding and pulverizing operations. The remaining cocoa butter presents the greatest difficulty during this operation. A temperature rise, resulting from the heat generated during grinding and pulverizing, to above 30° C. will soften the cocoa butter, and above 34° C. will melt it. The cocoa butter can then spread in a thin layer on the surface of the cocoa powder particles, causing them to stick together, in turn cushioning them against the shattering effect of the grinding machine. It is necessary to use cold, dry air in sufficient quantities to remove the heat generated by grinding and to cool the powder so that the butter will form a solid stable phase within the cocoa particles. If this is not achieved, instead of a fine cocoa powder, rich in color and maintaining its free flowing properties when packed, a powder will be produced which will be a dull color and be more liable to cake. Further, most cocoa powders are subjected to alkali treatment at some stage in their manufacture to improve their color, flavor and dispersibility. Fine, uniform particle size of the chocolate particles is important to efficient, effective alkalization.

Most types of hammer mills, impact mills and agitated-media mills have been used for grinding and pulverization of cake to form cocoa powder. Usually, these mills have some type of built-in grading system, such as mesh screens, cones, or sieve classifiers to ensure the desired degree and uniformity of fineness. Recycling arrangements also have been used to remove and reprocess coarse particles. Sieves and classifiers with aperture sizes of between 100–250 microns are commonly used in grinding the cocoa powder. The fineness and uniformity of particle size in the cocoa powder is an important property in all cocoa since, apart from its effect on taste, fineness and uniformity controls the rate of dispersion, homogeniety of color and rate of sedimentation of the chocolate particles in liquor products.

Refined Chocolate: One universal requirement of refined chocolate, whether bitter, sweet or milk chocolate, is that it should give no sensation of roughness when eaten. It has been shown that the palate cannot discriminate individual particles below about 30 microns in size, so it is essential that combination of the sugar and chocolate solids be carried to the point where only a small portion of the particles is above this size, see H. M. Mason, *Analyst* 58, 444, (1933). Conversely, it is generally critical to chocolate processing, particularly molding, extruding and enrobing, that the viscosity of the chocolate be maintained relatively high, requiring controlled and maintained particle size uniformity above about 10 microns. These requirements place a premium on the control and maintenance of a small, substantially uniform solid particle size in the chocolate.

At one time, the complete size reduction was achieved by the prolonged mixing of cocoa nibs with granulated sugar and cocoa butter in "melangeurs" of mortar-mill type with heavy granite rollers running on a revolving granite bed. Several days were required for the production of sufficiently fine chocolate. More recently, after a brief initial mix in the melangeur or other suitable mixer, the coarse paste is passed through a series of roll refiners. These comminuting machines may have from three to six water-cooled, hollow steel rolls, one above the other, and passage over as many as four sets of such refiners may be required to give the necessary fineness. As the surface area of the solids increases during grinding, an increasing amount of fat is required to maintain the fluidity of the paste being ground. Provision is therefore made for mixing in more cocoa butter, where necessary, between the comminuting stages. Modern refiners have capacities of up to 1800 pounds per hour and may be fitted with hydraulic devices for maintaining controlled pressure between the rolls, the pressure being indicated on gauges.

It is now common practice to use, in the preliminary mix, ingredients previously finely ground so that the number of refining grinds can be reduced. Starting with a mixture of chocolate liquor and sugar (pulverized in machines of the hammer-mill type), it is possible to obtain a sufficiently smooth final product by only a single-passage over the roll refiners.

Conching: Apart from mixing with more cocoa butter to provide the correct consistency for molding or enrobing, and addition of the desired flavoring material, some of the cheaper chocolates receive no further processing. All better-quality chocolates, however, undergo the treatment known as "conching" (so-called from the shell-like form of the original machines) to aerate the chocolate and remove undesirable components, such as acetic acid. The earliest type, and from a flavor standpoint still probably the most successful, is the longitudinal conche which consists essentially of a tank with a granite bed on which chocolate is pushed to and fro by a roller traveling backward and forward. The end of the conche is so shaped that chocolate that forced against it is splashed back over the roller into the body of the machine. The temperature of the chocolate during conching is 55°–85° C. for plain chocolate, but is lower for milk chocolate, generally in the range of 45°–55° C.; higher temperatures are sometimes used for the development of caramel-like flavors. The time taken may be twelve hours or less, particularly for milk chocolate. The viscosity of the chocolate is reduced during the early stages of conching.

The present invention overcomes the difficulties and disadvantages of prior art devices and methods. It provides a universal method for making chocolate liquor, chocolate butter and cocoa powder, and refined chocolate of superior quality and properties more efficiently and inexpensively. It reduces and often totally eliminates the need for water cooling during processing and can provide conching in the course of comminuting. It also reduces the amount of cocoa butter needed to make semi-sweet and milk chocolate. And most importantly, it provides better, sweet and milk chocolate and cocoa powder of controlled uniformity and fineness than heretofore attained in chocolate making.

SUMMARY OF THE INVENTION

Chocolate solids are ground in a liquid continuum at substantially lower cost by repeatedly circulating by a pump means the liquid containing chocolate solids through a comminuting means formed of a bed of agitated grinding elements in a confining vessel. The circulation proceeds at a rate of at least about 30 and preferably between 50 and 500 volumes of liquid continuum containing solids in the comminuting means per hour. That is to say, at least 30 volumes of the liquid dispersion capacity of the confining vessel is circulated through the comminuting means per hour. In this connection, it should be noted that the liquid dispersion capacity of the confining vessel is preferably about 35 to 50 percent of the total volume of the vessel. The remainder of the total volume of the confining vessel is taken up by the grinding elements and agitator. In any case, the grinding elements must be sufficient and restricted to provide for efficient grinding and dynamic sieve action as hereinafter described.

In some embodiments, the liquid containing chocolate solids may be circulated directly between the pump means and the comminuting means with the major portion of the liquid continuum in the system in the comminuting means, with the excess in the outlet or retaining chamber from the comminuting means, the pump means, and the conducting means between the pump and comminuting means.

In chocolate processing, it is preferred, however, to circulate the liquid continuum containing chocolate solids from and through a retaining or storage tank(s) or chamber(s) as well as the comminuting and pump means. In such embodiments, the retaining tank or chamber may take on different sizes and shapes and be integral with or separate from the comminuting means and/or pump means. Where integral with the comminuting means, a jacketed vessel may be provided with the retaining chamber or portion in the jacket space between the inner and outer vessels and the comminuting means in the inner comminuting vessel, or the retaining tank or chamber and comminuting means may be in one vessel separated by a simple retaining screen or the like. In any case, the total volume of the comminuting means is preferably several times less than the volume of the retaining chamber, but in other instances may be the same volume or less than the dispersion capacity of the comminuting means.

The method of grinding comprises first providing a liquid continuum of chocolate or chocolate flavored material to be ground suspended in a pumpable mass typically by heating and mixing the liquid continuum in a jacketed retaining chamber through which steam is circulated. In making sweet chocolate, milk chocolate and chocolate flavored materials, the liquid continuum is directly provided by melting chocolate liquor and by liquid vegetable fats that can provide the liquid phase. Where chocolate liquor is produced from nibs, the formation of the liquid continuum is typically provided by impact milling with a hammer mill or the like. Similarly, the comminuting of chocolate flavored compositions requires the use of a separate liquid continuum, such as vegetable fats, in which the cocoa powder can be suspended.

Whatever the specific grind, the liquid continuum containing suspended chocolate solids is circulated from a pump means through the comminuting means formed of a bed of agitated grinding elements at a rate of at least about 30 volumes and preferably between 50 and 500 volumes of liquid continuum containing solids in the comminuting means per hour. The suspended chocolate solids are comminuted in the comminuting means (by actual grind or deflocculation) as they pass with the liquid continuum therethrough and are discharged from the comminuting means with the liquid media at the same rate at an end portion substantially opposite from the point of circulation to the comminuting means. On discharge, the suspended chocolate solids with the liquid continuum are recycled to the pump means, or to a first or second retaining chamber, from where the chocolate solids with the liquid continuum are recycled back to the comminuting means.

The liquid continuum is recycled between the pump means, possibly one or more retaining chambers, and the comminuting means until the chocolate solids in the liquid continuum are reduced to the desired particle size and added ingredients such as sugar and milk are uniformly ground and homogeneously dispersed through the chocolate particles and liquid continuum. Chocolate solids, chocolate solid-liquids, cocoa butter and other ingredients may be added to the liquid continuum intermittently or continuously during the comminuting operation for various reasons. It has been generally recognized by those skilled in the art that a batch once provided is not usually supplemented by materials requiring processing, but rather maintained until the end of the grinding operation when the batch is removed and a new batch is provided; however, with the present invention, new chocolate solids such as nibs, sugar, milk powder and other ingredients can be dispersed in the already formed batch so that chocolate may be added during processing to provide an end product of dispersed chocolate solids of different desired comminuting times.

The method of making chocolate is preferably performed with an agitated-media comminuting means, described and claimed in the parent application hereto and described hereinafter. The liquid containing chocolate solids are repeatedly circulated through the bed of agitated grinding elements in a confining vessel at a velocity such that there are at least 30 volumes and preferably many volumes more, even up to and greater than 500 volumes of liquid continuum containing solids in the confining vessel per hour. The flow through the agitated-media vessel is preferably in a vertical direction and along the axis of the rotatable agitator within the vessel. To achieve this condition, a pump means is provided for causing repeated flow through the comminuting means at a rate of at least 30 volumes and preferably of between 50 and 500 volumes of comminuted liquid continuum continuing suspended solids in the comminuting means per hour. Further, a retaining chamber or portion is preferably provided at outlet portions of the comminuting means separated from the comminuting vessel by a retaining screen for retaining the grinding element in the comminuting means while permitting preferably substantially unrestricted passage of the liquid containing particulate solids from the comminuting means into the retaining chamber. The retaining chamber or portion as hereinafter more fully described is believed to aid in the circulation and operation by providing a more uniform flow through the comminuting means. Further, preferably a pumping means is provided in the retaining chamber, as hereinafter described, to facilitate flow of the generally highly viscous chocolate-liquid continuum from the retaining chamber for recirculation.

The flow through the agitated-media comminuting means is usually generally upwardly or downwardly. Preferably, however, the comminuting step is accomplished in an agitated-media comminuting means by passing the liquid continuum containing suspended chocolate solids preferably substantially upwardly through a bed of agitated grinding elements from bottom to top portions of the comminuting means. More preferred, the vertical progress of the liquid continuum containing the chocolate solid suspension through the comminuting means is at least 2 mm per second and preferably at least 5 mm per second.

The present invention is useful in preparing chocolate with controlled relatively small particle size and substantial particle size uniformity and other superior and unique properties. The reason for these special properties is believed to be the more uniform particle size distribution of the resulting chocolate product. The present invention is also an improvement in processing chocolate with little or no cooling by circulating water through the jackets of the retaining tank or comminuting (or confining) vessel.

The present invention also provides a method for removing undesirable components, such as acetic acid, from a chocolate or chocolate flavored material while retaining desirable components, e.g., flavors, in the composition. The method operates on the fact that undesirable components such as acetic acid vaporize at a temperature below the temperature at which substantial vaporization of the desired component is experienced. Circulation through the comminuting means proceeds at a rate such that combined with heating or cooling of the retaining chamber, comminuting means, or both, the processing temperature is maintained at a desired value where the undesirable component vaporizes or is otherwise liberated and the desirable component remains substantially unvaporized and retained in the composition.

Other details, objects and advantages of the present invention will become apparent as the following description of the present preferred embodiments thereof and present preferred methods of practicing the same proceeds.

BRIEF DESCRIPTION OF THE DRAWINGS

In the accompanying drawings, the present preferred embodiments of the invention and present preferred methods of practicing the invention are shown, in which.

DESCRIPTION OF THE PREFERRED EMBODIMENTS

Figure 1:
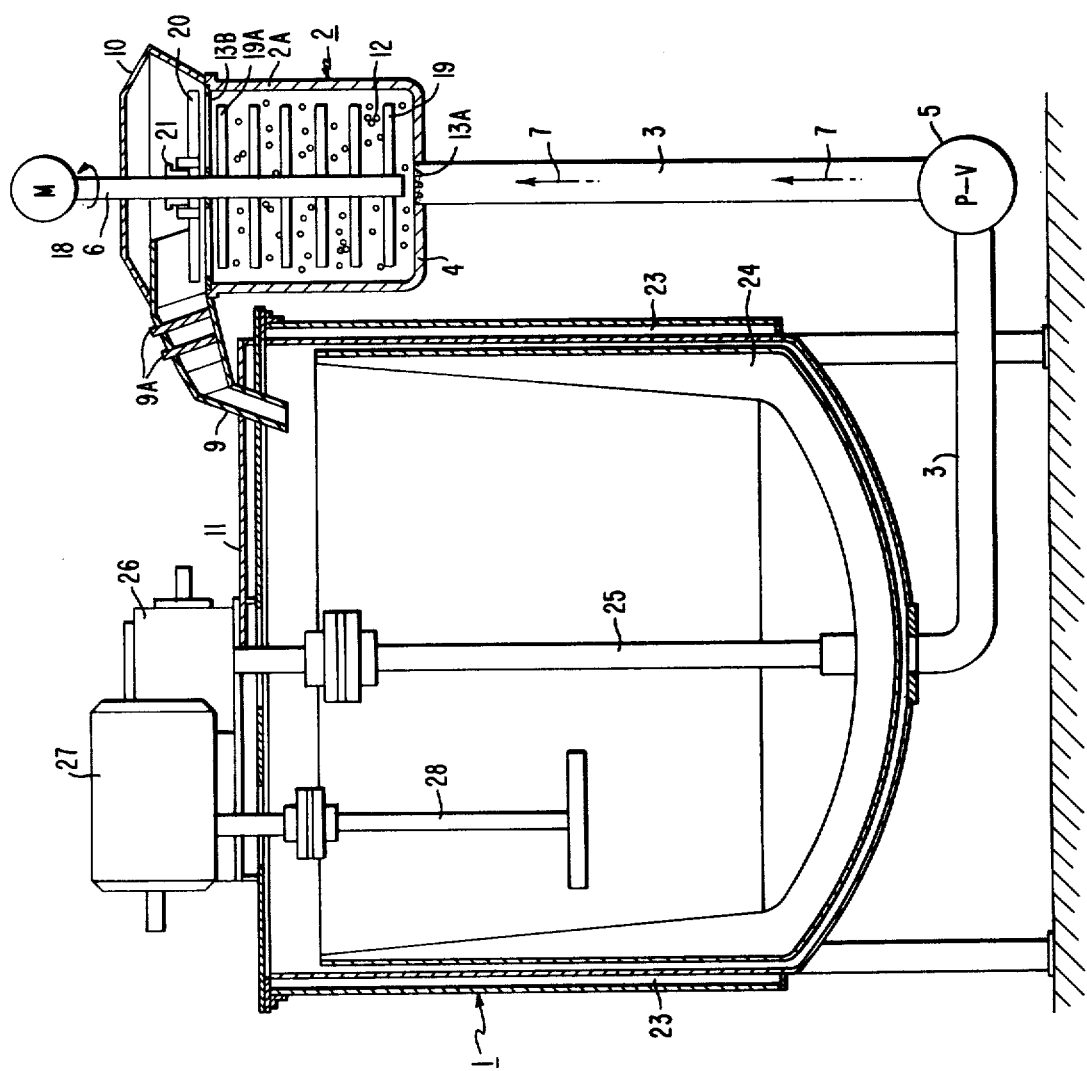
FIG. 1 is an elevational view in cross-section of a comminuting apparatus for use in practicing the present invention.

Referring to FIG. 1, apparatus for performance of the present invention is shown which comprises relatively large retaining tank or chamber 1 and relatively small agitated-media comminuting means 2 contained in comminuting (or confining) vessel 2A. The volume of comminuting vessel 2A without the grinding elements may, for example, be 5 to 10 times smaller in volume than the retaining chamber. The agitated-media comminuting means (or mill) may, for example, have a 30-gallon dispersion capacity with the grinding elements present so that the dispersion volume of comminuting means 2 is, in turn, approximately 33 times smaller than the volume of the retaining tank.

However, the existence and shape of the retaining tank as well as the difference in volume of the comminuting vessel and the retaining tank are not limiting. Indeed, the retaining tank may be the same or even smaller in volume than the comminuting means. By contrast, the shape of comminuting vessel 2A is important to provide the desired flow conditions. Specifically, the diameter of comminuting vessel 2A is preferably the about the same as its height as shown in FIG. 1 to reduce the resistance to flow through comminuting means 2.

Agitated-media comminuting means 2 contains grinding elements 12 which are typically steel balls of less than ½ and preferably ¼ inch in diameter. Alternatively, balls, pebbles, beads and the like of glass, ceramics, stone, tungsten carbide, titanium dioxide, sillimanite and the like, having a diameter of less than ½ inch, may be used as the grinding elements. In any case, the grinding elements are preferably between ⅛ and 5/16 inch and most desirably about ¼ inch in diameter.

Figure 3:
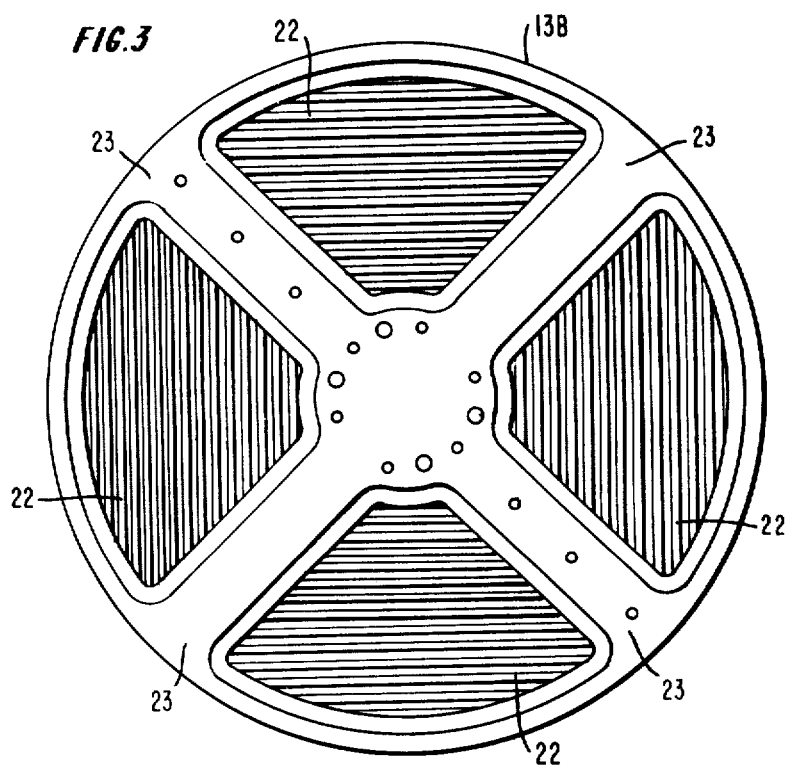
FIG. 3 is an enlarged, fragmentary cross-sectional view taken along line III—III of FIG. 1.

Means such as a suitable retaining screen 13A is provided in lower portion 4 of comminuting vessel 2A to prevent grinding elements 12 from entering conduit 3. Similar retaining screen means 13B is provided at the upper portion of comminuting vessel 2A to form a retaining chamber or portion 10 at outlet portions of comminuting means 2 separate from but integral with means 2 and vessel 2A. As shown in FIG. 3, retaining screen 13B is preferably comprised of support frame 23 of a periphery, center and radial segment into which is mounted bar grids 22. Bar grids 22 preferably provide a large discharge area, as shown in FIG. 3, to improve the circulation operation by providing a substantially unrestricted flow through comminuting means 2. With vessel 2A, retaining screen means 13A and 13B do, however, confine the movement of grinding elements 12 during agitation so that efficient grinding of the chocolate and dynamic sieve action on the chocolate particles as hereinafter described is obtained, while permitting preferably, substantially unrestricted passage of the liquid containing chocolate solids to and from the comminuting means. Storage or retaining tank 1 is also provided with a conical bottom and low speed anchor mixer 24 to prevent improper accumulation of solids on the interior surfaces of the tank, and to facilitate proper flow.

In operation, a liquid continuum typically of cocoa butter or vegetable fat containing suspended chocolates to be ground is provided in retaining tank 1. When chocolate flavored compositions are processed, the liquid continuum is typically vegetable fats. Retaining tank 1 is fitted with water jacket 23 and high speed mixer 28 to heat and mix the charged chocolate composition to permit formation of a pumpable mass and to further disperse ingredients in the chocolate solid-liquid mass preparatory or during comminution. High speed mixer 28 is preferably driven by electric motor 27, which also drives anchor mixer 24 through shaft 25 and gear train 26.

The liquid containing suspended chocolate solids, with sugar and other solids and liquid ingredients, are then circulated by pump 5 from bottom portions of retaining tank 1 through conduit 3 to bottom portion 4 of comminuting means 2 at a rate of at least about 30 and preferably 50 and 500 volumes of liquid containing solids in the comminuting means per hour. There, in the comminuting means 2, the chocolate solids in the liquid continuum are comminuted by action of the agitated grinding elements 12 as the liquid containing the solids are steadily passed upwardly through the comminuting means. Comminuting vessel 2A may also be jacketed (not shown) to heat or cool the liquid continuum during comminuting to control the temperature. At the upper portion of comminuting means 2, the liquid containing suspended chocolate solids is discharged from comminuting means 2 through bar grids 22 of retaining screen 13B preferably in a substantially unrestricted flow and back to retaining tank 1 through conduit 9.

This circulation and grinding is simultaneously continued until the chocolate solids in the liquid continuum are reduced to the desired particle size. Other chocolate solids, such as nibs, and other ingredients, such as sugar, may be added to the liquid during grinding, as desired. When the grinding is completed, the entire contents are removed from the system and a new pumpable mass provided for the next comminution operation. In some cases, such as in the comminuting of chocolate liquor, a seed bath may be retained in the system to provide the liquid continuum for grinding of nibs and the like.

The rate of comminution and the quality of the chocolate solids processed will depend directly on the flow rate of the liquid continuum containing solids through comminuting means 2. Preferably, grinding elements 12 (together with agitator 6) occupy at least about 50 percent of the volume of comminuting means 2 to provide a high density grinding bed on agitation. Stated another way, grinding elements 12 fill comminuting vessel 2A to a level such that less than about 15 percent of the volume of comminuting vessel 2A is free space apart from the grinding elements in an unagitated state so that the grinding elements can occupy on agitation not more than about 15 percent of their original volume. The remainder of the space is in the interstices between the unagitated grinding elements and is approximately 36 to 40 percent of the volume to the level occupied by the grinding elements. Most desirably, the grinding elements are filled to a level of about 90 percent of the comminuting (or confining) vessel, but practically not to a level more than about 95 percent of the comminuting vessel to avoid rapid mechanical failure of the comminuting means during agitation. The optimum density of the grinding elements will, of course, vary with the viscosity of the chocolate composition, the size and shape of the grinding elements, and the rotation speed of the agitator.

To provide for forming the agitated bed, grinding elements in comminuting means 12 overlie protuberances or agitating arms 19 of agitator 6. Shaft of agitator 6 is rotated by motor M as indicated by arrow 18. This rotation causes protuberances or agitating arms 19 thereof to be rapidly passed through the mass of grinding elements 12, thereby causing the grinding elements to occupy a greater apparent volume during grinding that at rest and form a bed of agitated grinding elements.

As shown in FIG. 1, suitable connections are also provided for flow of the liquid media containing suspended chocolate solids from retaining or storage tank 1 to comminuting means 2, through comminuting means 2 and then back to retaining tank 1. Specifically, a conduit or pipe 3 is provided between lower end portion of retaining tank 1 and lower or bottom portion 4 of the comminuting means 2 by conducting the liquid containing suspended chocolate solids to be ground. Suitable means, such as a pump 5, is provided in conduit 3 for causing desired forced flow of liquid continuum containing chocolate solids from the lower portion of the retaining tank 1 into lower portion 4 of the comminuting means 2 at a rate greater than 30 volumes and preferably between 50 and 500 volumes of liquid continuum containing solids in the comminuting means per hour.

Conduit 3 preferably of about 4 to 5 inches in diameter connects with lower portion 4 near the center axis of rotation of the agitator 6 of the comminuting means 2 so that flow of liquid continuum containing chocolate solids is in the direction of the arrows 7 through the conduit 3. That is, the flow through the agitated-media comminuting means 2 is preferably in a steadily upwardly vertical direction. In addition, conduit 9 connects between upper retaining portion 10, which is connected to the top of comminuting means 2, and upper portion 11 of tank 1 provide for return of the liquid media containing chocolate solids from comminuting means 2 back into retaining tank 1. And the flow rate is regulated primarily by the pumping rate of pump 5. However, high viscosity (e.g., 60,000 centipose) of the chocolate solid-liquid continuum and the density of the agitated grinding bed also effect the flow rate by the resistance developed. For this reason, a pump means, which is comprised of impeller 20 rigidly mounted by means 21 on agitator 6, is positioned in retaining chamber 10 and agitating arm 19A is provided adjacent retaining screen 13B in confining vessel 2A. The chocolate composition can thereby be assisted in discharging through retaining screen 13B in retaining chamber 10 and from retaining chamber 10 through conduit 9 to retaining tank 1. The density of the grinding elements depends primarily on the percentage of the comminuting vessel volume occupied by the grinding elements as above described, and to a lesser extent, on the size and shape of the grinding elements and the speed of rotation of agitator 6 which is typically between 100 and 400 revolutions per minute.

Also present in conduit 9 are rods 9A of a paramagnetic material, which have been magnetized. The rods 9A collect any metal chips formed during processing, immediately on their formation. The chocolate composition thus remains uncontaminated by iron oxide formed from metal chips during processing. Indeed, it has been found that iron oxide content can be maintained below 100 parts per million by use of magnetic rods 9A.

Figure 2:
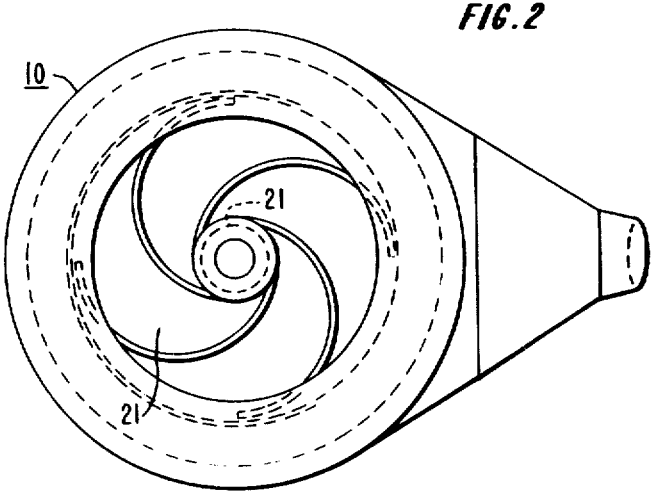
FIG. 2 is an enlarged, fragmentary top view taken along line II—II of FIG. 1.
Figure 4:
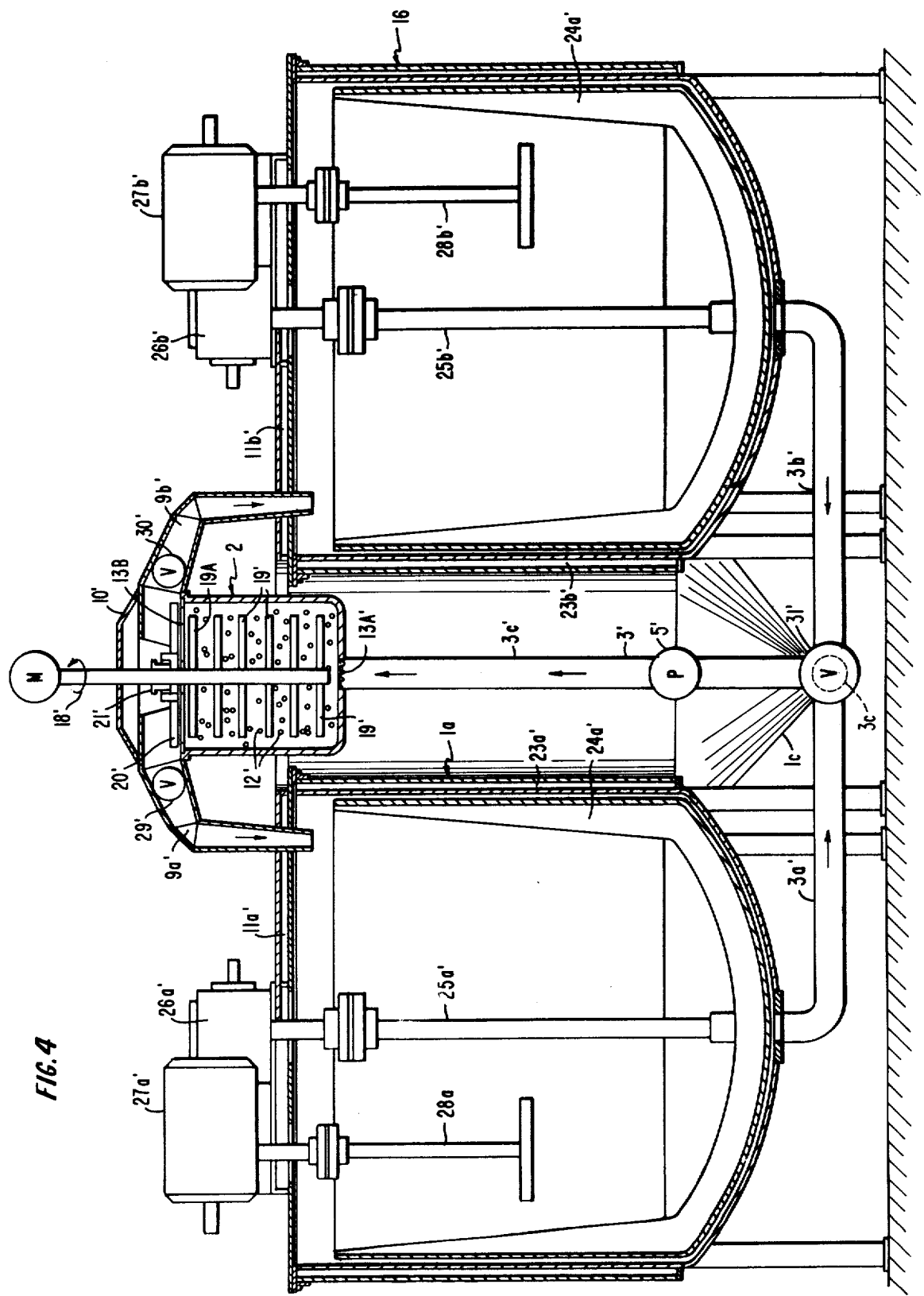
FIG. 4 is an elevational view in cross-section of an alternative grinding apparatus embodying the present invention wherein three separate retaining tanks are employed.

Referring to FIG. 4, an alternative embodiment for performance of the invention is shown which optimizes the operation, but is most costly than the apparatus shown in FIGS. 1 through 3. Specifically, this embodiment substantially reduces the probability that a given particle of chocolate solids remains in the retaining tank during a substantial part or all of the processing cycle. The apparatus in this embodiment has substantial similarity to that described in connection with FIGS. 1 through 3. For this reason, like components and operation have been given the same number as in FIG. 1 with a prime and, where appropriate because of duality, an "a" and "b" postscript. These like components and operation will not be generally repealed here.

The apparatus of FIG. 4 comprises in addition a plurality of storage or retaining chambers or tanks such as 1a or 1b as shown. Conducting means as hereafter described, are also provided (a) to connect retaining tanks 1a and 1b and comminuting means 2' so liquid carrying chocolate solids to be ground is caused to flow from first retaining tank 1a through comminuting means 2' into second retaining tank 1b until first retaining tank 1a' is substantially emptied, and (b) thereafter on reversal of the flow, the liquid continuum containing chocolate solids is caused to flow from second retaining tank 1b through comminuting means 2' and back to first retaining tank 1a. This means permits alternatively emptying first retaining tank 1a and then second retaining tank 1b through comminuting means 2' while maintaining the direction of flow through the comminuting means itself. The direction of flow in comminuting means 2' is again generally upwardly along the axis of the shaft of agitator 6'.

Specifically, conduit 3' of the apparatus shown in FIG. 2 has branches 3a', 3b' and 3c' connected by 3-way valve 31' which is controllable to optionally permit flow from the lower portion of retaining tank 1a' or from the lower portion of retaining tank 1b' into the lower portion 4' of comminuting vessel 2A'. Means such as the valves 29' and 30' are provided for optionally conducting, as desired, flow from upper retaining portion 10' adjacent comminuting means 2' through conduits 9a' or 9b' into either tank 1a' or tank 1b'. Suitable electrical control means (not shown) is connected to automatically control valves 29', 30' and 31' respectively. By this arrangement, one control means automatically opens 3-way valve 31' to permit flow through conduits 3b' and 3c' to comminuting means 2' and automatically closes and opens valves 29' and 30', respectively, to permit flow through conduit 9b' from the comminuting vessel to retaining tank 1b'. When retaining tank 1b' is emptied, the control means automatically changes 3-way valve 31', opens valve 9a' and closes valve 9b' to permit flow through conduit 3b' and 3c' to bottom portions 4' of comminuting means 2' and then from comminuting means 2' through conduit 9a' back to retaining tank 1a. Fluid flow through the comminuting means back and forth from one tank to the other is automatically continued until the desired particle size distribution is obtained in the chocolate product being ground. In certain embodiments, it may be appropriate to utilize yet a third retaining tank or chamber 1c. In such an embodiment, conducting means 3c are provided as above described to sequentially conduct the dispersion from and between the tanks while passing the dispersion through the comminuting means in the same direction on passage between each tank.

It would be expected that the grinding efficiency or speed of grinding of the entire mass of chocolate in the above system would depend primarily on the relative volumes of the comminuting means and storage chambers. It has been found, however, that the efficiency, or speed of grinding of the whole chocolate mass depends not only on how much time a given portion of the chocolate material spends in comminuting means 2', but on how frequently and how fast that portion passes through comminuting means 2'.

More specifically stated, if a given comminuting means 2 or 2' has a volume $1/N$ times the volume N of the retaining tank 1 or 1a', and the time required for grinding one comminuting vessel volume of chocolate material to a given particle size in the previous way shown in U.S. Pat. No. 2,764,359 (i.e., without circulation through a retaining tank) is t, it has been found that instead of requiring a time $N \times t$, the grinding time is much less. How much less in time is determined primarily by the number of gallons or units of liquid containing chocolate solids pumped by pump 5 or 5' through comminuting means 2 or 2' in a given time. This flow rate has been designated by the term "streaming speed". The higher the "streaming speed" in a system of given volume the higher the frequency that any given part of the material passes through comminuting means 2 or 2' and the faster the entire chocolate mass is ground to a given particle size. The limiting factor is that streaming speed be greater than at least 30 volumes of liquid continuum containing solids in the comminuting means per hour.

Since the grinding efficiency in the present invention is dependent on flow rate through the comminuting means, it follows that the retaining tank or chamber may be small, and may be integral with either the pump means or the comminuting means, or both. Indeed, although not preferred for chocolate processing, a retaining tank or portion may be minimized to that at the outlet of the comminuting means, such as shown by upper retaining portion 10 and 10' in FIGS. 1, 2 and 4; and the flow rate necessary to the invention may be accomplished simply by circulating the liquid containing suspended chocolate solids from one end portion of the comminuting means, through the pump means and back to an end portion of the comminuting means substantially opposite the existing end portion.

The comminuting mills of FIGS. 1 through 4 are generally designated herein as circulation agitated-media mills or simply agitated-media mills. The present invention makes special application of such mills in making chocolate and chocolate flavored materials. Chocolate and chocolate flavored materials can be rapidly comminuted to fine particle size and narrow particle size distributions heretofore not attained or considered attainable. Furthermore, chocolate and chocolate flavored materials of better quality can be made with the use of optimum amounts of cocoa butter (i.e. 27 to 29%), less cocoa butter than was previously characteristic (i.e. 32 to 34%) for the Weiner process (see British Pat. No. 1,251,043, and U.S. Pat. No. 3,229,701), and greater cocoa butter than previously useable (i.e. 24–25% max.) with standard three, four and five-roll refiners (because of slippage of the rolls). And cooling can be substantially reduced or eliminated entirely in chocolate processing by the present method, as well as power requirements generally reduced for processing a given quantity chocolate or chocolate flavored material.

In addition, the process can control the temperature during processing by a combination of circulation rate and comminuting speed, and heating or cooling of the comminuting vessel, retaining tank, or both. The heating or cooling is provided by circulating steam or water, respectively, to the water jackets of the comminuting vessel, retaining tank, or both. The temperature is selected to provide vaporization or gasification of undesirable components and particularly acetic acid from the chocolate compositions, while retaining desired components and particularly flavor.

The desired temperature for this processing varies with the character of the chocolate or chocolate flavor material being processed. The following Table I summarizes the acceptable and preferred temperature ranges for each type of composition.

TABLE I

| Composition | Temperature Range | |
|---|---|---|
| | Acceptable (°F.) | Typical (°F.) |
| Chocolate liquor (prepared from flavor bean nibs) | 110 to 150 | 125 to 135 |
| Chocolate liquor (prepared from filler bean nibs) | 110 to 230 | 160 to 200 |
| Semi-Sweet chocolate (prepared from flavor bean nibs) | 110 tp 140 | 125 to 140 |
| Semi-Sweet chocolate (prepared from filler bean nibs) | 110 to 200 | 150 to 180 |
| Milk Chocolate | 100 to 125 | 110 to 125 |
| Chocolate Flavored Material (vegetable fat and sugar) | 100 to 125 | 110 to 125 |
| Chocolate Flavored Material (vegetable fat and artificial sweetener) | 100 to 125 | 110 to 125 |

Other details, objects and advantages of my invention will be apparent from the following non-limiting examples.

EXAMPLE I

For comparison purposes, a dispersion of previously processed chocolate liquor was ground in a pilot size batch-type agitated-media mill. Specifically the mill was a water jacketed S-1 Attritor TM made by Union Process, Inc., 1925 Akron Peninsula Road, Akron, Ohio. The mill was fitted with a 2 or 2½ Hp electric motor for agitation at about 300 rpm, and filled about 3/5 full of grinding media (i.e. 2/5 free-space above the media at rest). The media was ¼ inch steel balls. The dispersion of chocolate liquor was melted at 150° F., and the particle size (i.e. fineness) measured by micrometers using standard procedures to be 40 microns. A charge of the chocolate liquor weighing 8 pounds was then placed in the agitated-media mill, and grinding commenced with water cooling of the comminuting tank to maintain temperature. Samples were taken after 15, 20, 25 and 45 minutes and the particle size measured with micrometers. The results are shown in Table I.

TABLE I

| Processing Time (Minutes) | Particle Size (Microns) |
|---|---|
| 15 | 25 |
| 20 | 17 |
| 25 | 15 |
| 45 | 12 |

EXAMPLE II

In a preliminary test, a dispersion of the previously processed chocolate liquor of Example I was used. The dispersion processed in a pilot size agitated-media mill similar to that shown in FIG. 1, but without the impeller in the retaining chamber of the grinding tank. Specifically, the mill was a water jacketed Q-1 Attritor TM made by Union Process, Inc., 1925 Akron Peninsula Road, Akron, Ohio. The mill was fitted with a 2¼ Hp electric motor for agitation at 300 rpm and a ½ Hp for circulation, and comminuting volume in the grinding tank of 1½ gallons. The comminuting volume of the grinding tank was filled to about 70% full (i.e. 30% free space above the media at rest) with grinding media of ¼ inch steel balls, to provide of processing material volume of ⅝ gallon in the comminuting vessel. The retaining screen was restricted as shown in FIG. 3 (with circular openings) to provide a discharge area about 4 square inches.

The chocolate liquor used in Example I was melted at 150° F. and the particle size measured by micrometers using standard procedures to be 40 micron. A charge of 32 pounds was then placed in the retaining tank of the agitated-media mill. The processing was then commenced using water cooling to insure temperature control, and continued for 25 minutes. At the end of the grind the particle size measured 13 microns.

As shown by comparison with Example I, the processing of chocolate liquor with the circulation agitated-media mill of Example II provided a substantial reduction in comminuting time.

EXAMPLE III

A dispersion of pre-ground chocolate liquor was prepared from filler bean nibs by standard hammer mill processing. The dispersion was processed in the same agitated-media mill described in Example II.

The pre-ground chocolate liquor, which weighed 35 pounds (3½ gallons), was melted in the retaining tank at 140° F. The original fineness of the material measured 135 microns, measured with micrometers using standard procedures. The liquor was then circulated at 120 gallons per minute during the first 5 minutes of grinding, and then the circulation rate changed each 5 minutes as shown in Table I. Each 5 minutes, the temperature and circulation rate were also measured in the retaining tank, and a sample taken and the fineness measured. The results are shown in Table II.

TABLE II

| Processing Time (minutes) | Particle Size (microns) | Temperature (°F.) | Circulation Rate (gal. per min.) |
|---|---|---|---|
| 5 | 100 | 120 | 200 |
| 10 | 80 | 121 | 200 |

TABLE II-continued

| Processing Time (minutes) | Particle Size (microns) | Temperature (°F.) | Circulation Rate (gal. per min.) |
|---|---|---|---|
| 15 | 62.5 | 121 | 160 |
| 20 | 55 | 126 | 160 |
| 25 | 55 | 130 | 175 |
| 30 | 45 | 130 | 175 |

The chocolate liquor was then comminuted at good speed while maintaining the temperature substantially uniform with little or no cooling of the jacketed retaining tank or jacket agitated-media mill. Although an improvement, the comminuting speed was not as fast, and the product not as fine as desired for fine quality chocolate.

EXAMPLE IV

A second dispersion of pre-ground chocolate liquor was prepared from filler bean nibs by standard hammer mill processing. The dispersion was processed in the same agitated-media mill as that used for Example II, except that comminuting vessel was 90% full of grinding media (i.e. 10% free space above the media at rest) and the processing material volume proportionally reduced to ½ gallon to increase the density of the agitated-media bed, and the anchor mixer blades Teflon TM coated to obtain better scraping action in the retaining tank. The fineness of the chocolate liquor as charged in the retaining tank was 114 microns, measured with micrometers using standard procedures. The chocolate liquor, weighing 35 pounds (3½ gallons), was melted in the retaining tank at about 140° F., and circulated steadily (or continuously) during processing at 120 gallons per hour. The temperature and circulation rate were measured each 5 minutes during grinding, and samples taken and the fineness measured every 5 minutes with micrometers using standard procedures. The results as shown in Table III.

TABLE III

| Processing Time (minutes) | Particle Size (microns) | Temperature (°F.) | Circulation Rate (gal. per min.) |
|---|---|---|---|
| 5 | 62 | 120 | 120 |
| 10 | 35 | 125 | 120 |
| 15 | 30 | 128 | 120 |
| 20 | 23 | 132 | 120 |
| 25 | 20 | 136 | 120 |

As shown by Table III, the comminuting speed was substantially improved over similarly processed chocolate liquor with a batch 1-S Attritor TM unit, and over that experienced by others with four-and five-roll refiners and the Weiner process (see British Pat. No. 1,251,043), while maintaining the temperature substantially uniform with little or no colling of the retaining or comminuting tanks with water circulation. Further, the comminuting speed was an improvement over that observed in Example III.

EXAMPLE V

A coarser dispersion of pre-ground chocolate liquor was prepared from filler bean nibs by standard hammer mill processing, and charged to the agitated-media mill described in Example II with the variants described in Example IV. The chocolate liquor was charged to the retaining tank and melted at a temperature of 136° F. The original coarseness of the liquor was 212 microns measured with micrometers using standard procedures, and the circulation rate was at 60 gallons per minute for the first five minutes and then increased thereafter. The temperature and circulation rate were again measured every five minutes, and samples taken and measured with a micrometer using standard procedures with results shown in Table IV.

TABLE IV

| Processing Time (minutes) | Particle size (microns) | Temperature (°F.) | Circulation Rate (gal. per min.) |
|---|---|---|---|
| 5 | 105 | 123 | 120 |
| 10 | 100 | 133 | 140 |
| 15 | 57.5 | 140 | 160 |
| 20 | 37.5 | 146 | 160 |
| 25 | 25 | 155 | 250 |
| 30 | 25 | 156 | 250 |
| 35 | 20 | 156 | 250 |
| 40 | 12.5 | 160 | 250 |
| 45 | 7.5 | 160 | 250 |

As shown in Table IV, the chocolate liquor was comminuted rapidly to a very fine particle size while the temperature remained relatively low even though no cooling water was supplied to the water jackets of the retaining tank or comminuting vessel.

EXAMPLE VI

Another coarser dispersion of pre-ground chocolate liquor was prepared from filler bean nibs utilizing standard hammer mill processing, and charged to the agitated-media mill described in Example II with the variants described in Example IV. Additionally the retaining screen was changed to the configuration shown in FIG. 3, to increase the discharge area of the retaining screen to seventeen square inches and cause discharge through the retaining screen in a substantially unrestricted flow. The dispersion of chocolate liquor, weighing 35 pounds (3½ gallons), was charged to the retaining tank, where it was melted at 160° F. The particle size of the charged liquor was measured with micrometers using standard procedures and found to be 170 microns. Processing was then performed for 25 minutes at a circulation rate of 120 gallons per minute. The temperature and circulation rates were measured every 5 minutes, and a sample taken every 5 minutes and the particle size (i.e. fineness) measured using micrometers and standard procedures. The results are shown in Table V.

TABLE V

| Processing Time (minutes) | Particle Size (microns) | Temperature (°F.) | Circulation Rate (gal. per. min.) |
|---|---|---|---|
| 5 | 51 | 160 | 120 |
| 10 | 36 | 159 | 120 |
| 15 | 20 | 152 | 120 |
| 20 | 15 | 154 | 120 |
| 25 | 12 | 154 | 120 |

The chocolate liquor was thus comminuted to a very fine particle size, smaller than previously experienced in commercial chocolate liquor processing in a relatively short period of time. Furthermore, very little cooling water was used in water jackets of the retaining tank and comminuting tank to maintain the temperature of the liquor during grinding between 152° and 160° F.

EXAMPLE VII

Another coarser dispersion of pre-ground chocolate liquor was prepared from filler bean nibs utilizing standard hammer mill processing and was charged to the agitated-media mill described in Example II with the variants described in Examples IV and VI. The charge of 35 pounds (3½ gallons) was melted in the retaining tank at 139° F. The particle size of the chocolate was measured by micrometers using standard procedures to be 120 microns. The processing was then performed using a circulation rate of 120 gallons per minute for 35 minutes. The temperature and circulation rate were measured every 5 minutes, and samples taken and fineness measured by micrometers using standard procedures. The results are shown in Table VI.

TABLE VI

| Processing Time (minutes) | Particle Size (microns) | Temperature (°F.) | Circulation Rate (gal. per min.) |
|---|---|---|---|
| 5 | 80 | 144 | 120 |
| 10 | 30 | 157 | 120 |
| 15 | 16 | 150 | 120 |
| 20 | 12 | 156 | 120 |
| 25 | 12 | 154 | 120 |
| 30 | 10 | 152 | 120 |
| 35 | 8 | 152 | 120 |

Again it was found that comminution could be accomplished rapidly to a very fine particle size while maintaining the temperature within a very narrow range with little or no cooling of the chocolate liquor in the jackets of the retaining or comminuting vessels.

EXAMPLE VIII

A dispersion of partially refined flavor-bean chocolate was charged to the agitated-media mill described in Example II with the variants described in Example IV. The discharge area through the retaining screen was restricted to about 4 square inches. This type of chocolate liquor must be refined at a temperature not exceeding 140° F. (65° C.) to retain its characteristic flavor. The charge was 35 pounds (3½ gallons) was melted in the retaining tank at 118° F. The particle size measured 80 microns by micrometers using standard procedure. Processing was commenced with a circulation rate of 90 gallons per minute and was increased to 120 gallons per minute after 5 minutes. The temperature and circulation rate were measured every five minutes, and samples taken and the fineness measured by micrometers using standard procedures every five minutes. Processing was continued for 30 minutes. The results are shown in Table VII.

TABLE VII

| Processing Time (minutes) | Particle Size (microns) | Temperature (°F.) | Circulation Rate (gal. per min.) |
|---|---|---|---|
| 5 | 55 | 128 | 120 |
| 10 | 46 | 126 | 120 |
| 15 | 36 | 125 | 120 |
| 20 | 30 | 125 | 120 |
| 25 | 25 | 125 | 120 |
| 30 | 20 | 125 | 120 |

As shown by Table VII, no difficulty was encountered in comminuting the liquor to good commercial fineness (i.e. 20 microns) rapidly, while controlling the temperature within 3° F. with small amounts of cooling water circulation through the jackets of the retaining tank and the comminuting tank.

EXAMPLE IX

A dispersion of chocolate liquor was prepared from favor cocoa beans (Ecuadorian), and charged to the agitated-media mill described in Example II with the variants of Examples IV and VI. The discharge area of the retaining screen was substantially unrestricted, about 17 square inches. The charge, weighing 35 pounds (3½ gallons) was melted in the retaining tank at 125° F., and fineness (i.e. particle size) measured by micrometers using standard techniques at 80 microns. Again, this type of chocolate bean must be processed at a temperature not exceeding 140° F. (65° C.) to maintain flavor characteristics. The processing was commenced at a circulation rate of 90 gallons per minute, and after 5 minutes was increased and continued at a circulation rate of 120 gallons per minute for an additional 25 minutes. Every 5 minutes, the temperature and circulation rate were measured and samples taken and particle size measured by micrometers using standard procedures. The results are shown in Table VIII.

TABLE VII

| Processing Time (minutes) | Particle Size (microns) | Temperature (°F.) | Circulation Rate (gal. per min.) |
|---|---|---|---|
| 5 | 54 | 138 | 120 |
| 10 | 33 | 140 | 120 |
| 15 | 26 | 140 | 120 |
| 20 | 20 | 140 | 120 |
| 25 | 17 | 140 | 120 |
| 30 | 13 | 140 | 120 |

As shown by Table VIII, the liquor was comminuted to a very fine particle size rapidly, while controlling the temperature within 2° F. with the relatively low speed circulation of cooling water through the jacket of the retaining tank.

EXAMPLE X

A dispersion of chocolate liquor was prepared from filler bean nibs using standard hammer mill processing, and charged to the agitated-media mill described in Example II with the variants described in Example IV. The discharge area of the retaining screen was restricted to about 4 square inches. The charge of 35 pounds (3½ gallons) was melted in the retaining tank at 131° F., and the fineness measured at 140 microns by a micrometer using standard procedures. In this example, the circulation rate was varied and the comminuting time was extended to twice that of the previous examples. (1 hour) Processing commenced at a circulation rate of 30 gallons per minute, after ten minutes the circulation rate was increased to 60 gallons per minute, and after fifteen minutes the circulation rate was increased and continued at 120 gallons per minute. Further cooling was performed as indicated only during the indicated 10 minutes period during processing. The temperature and circulation rate were measured every 5 minutes during processing, and samples taken and the particle size measured by micrometers using standard procedures. The results are shown in Table IX.

TABLE IX

| Processing Time (minutes) | Particle Size (microns) | Temperature (°F.) | Circulation Rate (gal. per min.) |
|---|---|---|---|
| 5 | 93 | 123 | 30 |
| 10 | 90 | 128 | 60 |
| 15 | 64 | 131 | 120 |
| 20 | 51 | 134 | 120 |
| 25 | 42 | 138 cooling started | 120 |
| 30 | 30 | 134 | 120 |
| 35 | 23 | 123 cooling off | 120 |
| 40 | 18 | 122 | 120 |
| 45 | 14 | 126 | 120 |
| 50 | 12 | 129 | 120 |
| 55 | 12 | 132 | 120 |
| 60 | 12 | 136 | 120 |

As shown by Table IX, the chocolate liquor was comminuted rapidly to a very fine particle size, while controlling the temperature during processing to a relatively narrow range. As shown, temperature is more difficult to control the finer the particle size, but the increase in circulation rate was found to assist in maintaining the temperature with little or no cooling.

EXAMPLE XI

Another charge of the same dispersion of chocolate liquor used in Example X was charged to an agitated-media mill described in Example II with the variants described in Examples IV and VI. The discharge area of the retaining screen was substantially unrestricted, being seventeen square inches. The charge, weighing 35 pounds (3½ gallons), was melted at 130° F., and the particle size again measured at 140 microns by micrometers using standard techniques. Processing was done at a constant circulation rate of 120 gallons per minute for 45 minutes. Every 5 minutes, the temperature and circulation rate were measured and samples and particle size measured by micrometers using standard procedures. The results of the comminution are shown in Table X.

TABLE X

| Processing Time (minutes) | Particle Size (microns) | Temperature (°F.) | Circulation Rate (gal. per min.) |
|---|---|---|---|
| 5 | 92 | 150 | 120 |
| 10 | 70 | 155 | 120 |
| 15 | 35 | 150 | 120 |
| 20 | 27 | 144 | 120 |
| 25 | 16 | 142 | 120 |
| 30 | 14 | 140 | 120 |
| 35 | 10 | 140 | 120 |
| 40 | 8 | 137 | 120 |
| 45 | 7 | 138 | 120 |

As shown by Table X, the chocolate liquor was again comminuted relatively fast to a very, very fine particle size, while the temperature was controlled within a relatively narrow range (i.e. 12° F.) with a small amount of cooling by water circulation through the jacket of the retaining tank started after ten minutes of comminuting. Further, by comparison with Example X, it can be seen that faster comminuting, finer particle size and better temperature control were achieved by increasing to substantial unrestrict the discharge through the retaining screen.

EXAMPLE XII

Another dispersion of chocolate liquor was prepared from filler beans nibs using standard hammer mill practices. The chocolate liquor was processed in an agitated-media mill as described in Example II with the variants described in Examples IV and VI. A charge of the chocolate liquid weighing 35 pounds (3½ gallons) was melted in the retaining tank of the agitated-media mill at 124° F., by steam heating through the water jacket, as in the examples hereinbefore described. The particle size of the chocolate liquor was measured by micrometer using standard procedures to be 210 microns. Processing was commenced with a circulation rate of 30 gallons per minute and was increased to 60 gallons per minute after 10 minutes and continued for an additional 25 minutes. The temperature and circulation rate were measured every five minutes, and samples were taken and the particle size measured with micrometers using standard procedures every five minutes. The results are shown in Table XI.

TABLE XI

| Processing Time (minutes) | Particle Size (microns) | Temperature (°F.) | Circulation Rate (gal. per min.) |
|---|---|---|---|
| 5 | 75 | 119 | 30 |
| 10 | 67.5 | 123 | 60 |
| 15 | 50 | 120 | 60 |
| 20 | 35 | 135 | 60 |
| 25 | 37.5 | 140 | 60 |
| 30 | 25 | 143 | 60 |
| 35 | 20 | 146 | 60 |

As shown in Table XI, the chocolate liquor was processed to a good commercial particle fines (i.e. 20 microns) very rapidly without the use of any cooling whatsoever. The temperature rise during comminuting was greater than experienced in prior processes where cooling was employed, but was certainly within acceptable limits for processing of quality chocolate and was substantially better than prior processing where cooling was not used.

EXAMPLE XIII

A dispersion of chocolate liquor was again prepared from filler beans nibs by standard hammer mills processing. The chocolate liquor was processed in an agitated-media mill as described in Example II with variants as described in Examples IV and VI. A charge of 35 pounds (3½ gallons) of the chocolate liquor was placed in the retaining tank and melted at a temperature of 132° F. The particle size was measured by micrometers using standard procedures and found to be 170 microns. Processing was commenced at a circulation rate of 120 gallons per minute, and after five minutes was increased and varied as shown in Table XII. The temperature and circulation rate were measured every five minutes, and samples taken and particle size measured by micrometers using standard procedures every five minutes. The results are shown in Table XII.

TABLE XII

| Processing Time (minutes) | Particle Size (microns) | Temperature (°F.) | Circulation Rate (gal. per min.) |
|---|---|---|---|
| 5 | 120 | 120 | 120 |
| 10 | 55 | 128 | 230 |
| 15 | 42 | 132 | 250 |
| 20 | 25 | 135 | 250 |

TABLE XII-continued

| Processing Time (minutes) | Particle Size (microns) | Temperature (°F.) | Circulation Rate (gal. per min.) |
|---|---|---|---|
| 25 | 20 | 133 | 250 |
| 30 | 20 | 140 | 250 |

As shown for Table XII, the chocolate liquor was rapidly reduced to a good commercial fineness (i.e. 20 microns) without any cooling water being utilized in processing.

EXAMPLE XIV

A dispersion of chocolate flavored compound for coatings was prepared using the following ingredients: powdered sugar, vegetable fat, milk solids, cocoa powder, lecithin, salt and flavoring. The content was 7-9% cocoa powder and 29.4% total fat. The compound was processed in an agitated-media mill as described in Example II with the variants described in Example IV. the discharge area of the retaining screen was restricted to about 4 square inches. A charge of the compound weighing 35 pounds was prepared to a pumpable mass at 104° F. by mixing and heating in the retaining tank of the agitated-media mill, and the particle size measured by micrometers using standard procedures to be 90 microns. Processing was commenced at 140 gallons per minute and reduced to 130 gallons per minute after 20 minutes. Every five minutes, the temperature and circulation rates were measured and a sample taken and measured by micrometers with standard procedures. The results are shown in Table XIII.

TABLE XIII

| Processing Time (minutes) | Particle Size (microns) | Temperature (°F.) | Circulation Rate (gal. per min.) |
|---|---|---|---|
| 5 | 46 | 115 | 140 |
| 10 | 37 | 119 | 140 |
| 15 | 31 | 121 | 140 |
| 20 | 29 | 121 | 130 |
| 25 | 26 | 125 | 130 |
| 30 | 23 | 125 | 130 |
| 35 | 20 | 124 | 130 |

As shown by Table XIII, the process is applicable to rapidly comminute a chocolate flavor compound to a good commercial fineness while controlling temperature within a very narrow range (i.e. 9° F.) without extensive cooling. Only very small amounts of cooling were used during comminuting by introducing cooling water into the jacket of the comminuting tank.

EXAMPLE XV

A dispersion of chocolate flavored compound for coatings similar in composition to that described in Example XIV was preground by standard procedures and submitted for final processing. The compound was processed in an agitated-media mill as described in Example II with the variants of Example IV. The discharge area in the retaining screen was restricted to about 4 square inches. A charge of the compound weighing 35 pounds was prepared by heating and mixing in the retaining tank to form a pumpable mass at a temperature of 127° F. The particle size of mass was measured by micrometers using standard procedures and found to be 75 microns. Processing was performed at a constant circulation rate of 130 gallons per minute for 25 minutes. Every 5 minutes, the temperature and circulation rate were measured, and a sample taken and the particle size measured by micrometers using standard procedures. The results are tabulated in Table XIV.

TABLE XIV

| Processing Time (minutes) | Particle Size (microns) | Temperature (°F.) | Circulation Rates (gal. per min.) |
|---|---|---|---|
| 5 | 45 | 118 | 130 |
| 10 | 34 | 120 | 130 |
| 15 | 31 | 125 | 130 |
| 20 | 28 | 128 | 130 |
| 25 | 24 | 130 | 130 |

As shown in Table XIV, the chocolate compound was rapidly comminuted to a good commercial fineness with only small amounts of cooling. Throughout the processing, the temperature was maintained between 118° and 130° F. with circulation of only a small amount of water to the jacket of the retaining tank.

EXAMPLE XVI

Example XV was repeated with the same chocolate compound for coatings and same agitated-media mill except that the discharge area of the retaining screen was increased to 17 square inches to provide substantially unrestricted discharge through the retaining screen, and small differences in circulation rates were recorded. The circulation rate was initially 60 gallons per minute and was increased to 120 gallons per minute after 5 minutes. Every 5 minutes, the temperature and circulation rates were again measured, and a sample taken and the particle size measured by micrometer using standard procedures. The results are tabulated in Table XV.

TABLE XV

| Processing Time (minutes) | Particle Size (microns) | Temperature (°F.) | Circulation Rate (gal. per min.) |
|---|---|---|---|
| Start | 75 | 115 | 60 |
| 5 | 36 | 120 | 120 |
| 10 | 26 | 120 | 120 |
| 15 | 21 | 122 | 120 |
| 20 | 16 | 120 | 120 |

As shown by Table XV, the chocolate compound was rapidly reduced to a fine particle size while the temperature of the compound was controlled within the narrow range of 7° F. with circulation of only small amounts of cooling water to the jacket of the comminuting vessel. Additionally, the effect of increasing the discharge area of the retaining screen to substantially unrestrict discharge through the screen can be seen by comparison with Example XV.

EXAMPLE XVII

A dispersion of milk chocolate was prepared of the following composition: 55% powdered sugar, 19% cocoa butter, 13% whole milk solids, 11% chocolate liquor and the remainder lecithin, salt and flavorings. The total fat content of the milk chocolate was 29%, with about 4% milk fat and the remainder cocoa butter.

The milk chocolate was processed in the agitated-media mill described in Example II with the variants described in Example VI. The discharge area of the retaining screen was restricted to about 4 square inches. 35 Pounds (3½ gallons) of milk chocolate were charged to the retaining tank and prepared for processing by heating and mixing the mass to a pumpable consistency at 106° F. Processing was then commenced at 60 gallons per minute for the 5 minutes and continued thereafter at 30 gallons per minute. The temperature and circulation rate areas were measured every 5 minutes, and samples taken and particle size were measured by micrometers using standard procedures every 5 minutes. The results are listed in Table XVI.

TABLE XVI

| Processing Time (minutes) | Particle Size (microns) | Temperature (°F.) | Circulation Rate (gal. per min.) |
|---|---|---|---|
| Start | 107.5 | 106 | 60 |
| 5 | 65.0 | 126 | 30 |
| 10 | 45.0 | 128 | 30 |
| 15 | 40.0 | 128 | 30 |
| 20 | 35.0 | 128 | 30 |
| 25 | 27.5 | 128 | 30 |
| 30 | 25.0 | 128 | 30 |

As shown by Table XVI, milk chocolate can be rapidly comminuted to a commercially acceptable fine particle size with close control of the temperature during processing without significant cooling. The only cooling used in this Example was a trickle of cooling water into the jacketed grinding tank beginning 10 minutes after processing was started.

EXAMPLE XVIII

Example XVII was repeated with a milk chocolate of substantially the same composition as that described in Example XVII. The same agitated-media mill was used as in Example XVII except that the discharge area of the retaining screen was substantially unrestricted, being 17 square inches, and a slightly higher circulation rate was used. 35 Pounds (3½ gallons) of milk chocolate were charged to the retaining tank where the mass was heated and mixed to a pumpable consistency at 100° F. Processing was then commenced at 120 gallons per minute for the five minutes and thereafter maintained at 90 gallons per minute. Every five minutes, the temperature and circulation rate were measured, and samples taken and the particle size measured using micrometers and standard procedures. The results are listed in Table XVII.

TABLE XVII

| Processing Time (minutes) | Particle Size (microns) | Temperature (°F.) | Circulation Rate (gal. per min.) |
|---|---|---|---|
| Start | 80 | 100 | 120 |
| 5 | 50 | 130 | 90 |
| 10 | 37 | 130 | 90 |
| 15 | 30 | 127 | 90 |
| 20 | 25 | 127 | 90 |

As shown by Table XVII, a milk chocolate composition was again rapidly reduced to a commercially acceptable particle size while controlling the temperature with a minimal amount of cooling. The only cooling was a trickling of cooling water into the jacket of the comminuting tank which was commenced after 10 minutes of comminuting and continued to the end of the processing. Also comparing with Example XVII, it can be seen that the comminuting time is substantially reduced by increasing the circulation rate and substantially unrestricting the discharge area of the retaining screen.

EXAMPLE XIX

A dispersion of semi-sweet chocolate was prepared of the following ingredients: sugar, chocolate liquor (prepared from filler bean nibs), cocoa butter, lecithin and flavorings. The total fat content was about 20%, which came from the cocoa butter. It should be noted that typically the cocoa butter content of semi-sweet chocolate, as well as milk chocolate, is above 30% and usually about 32% to 34% cocoa butter. Processing was performed in an agitated-media mill such as that described in Example II, with the variant described in Example IV. The discharge area of the retaining screen was restricted to about 4 square inches. A charge of 35 pounds of the dispersion was charged to the retaining tank of the agitated-media mill, and melted at 120° F. The particle size was measured by micrometers using standard procedures and found to be 100 microns. Processing was commenced and continued for 30 minutes at a circulation rate of 30 gallons per minute. Every 5 minutes, the temperature and circulation rate were measured, and a sample was taken and particle size measured by micrometers using standard procedures. The results are shown in Table XVIII.

TABLE XVIII

| Processing Time (minutes) | Particle Size (microns) | Temperature (°F.) | Circulation Rate (gal. per min.) |
|---|---|---|---|
| Start | 100 | 120 | 30 |
| 5 | 80 | 120 | 30 |
| 10 | 50 | 131 | 30 |
| 15 | 32.5 | 148 | 30 |
| 20 | 30 | 152 | 30 |
| 25 | 27.5 | 160 | 30 |
| 30 | 25 | 160 | 30 |

As shown by Table XVIII, the semi-sweet chocolate composition was rapidly comminuted to a commercially acceptable size while the temperature was controlled within an acceptable range without the use of any cooling during processing. Further, a good quality semi-sweet chocolate composition was prepared using less cocoa butter than previous processing, and even less amounts of cocoa butter (e.g. 27%) is anticipated to be useable without significantly affecting the quality of the final composition.

EXAMPLE XX

A dispersion of semi-sweet chocolate similar in composition to that used in Example XIX was processed in an agitated-media mill described in Example II with the variant described in Examples IV and VI. The discharge area of the retaining screen was increased to 17 square inches and thereby made substantially unrestricted. 35 Pounds of the chocolate composition were charged to the retaining tank of the agitated-media mill, and melted at 115° F. to a pumpable mass. Processing was then commenced and continued for 10 minutes at a circulation rate of 30 gallons per minute. Every 5 minutes, the temperature and circulation rate were measured and samples were taken and the particle size measured by micrometers using standard procedures. The results are tabulated in Table XIX.

TABLE XIX

| Processing Time (minutes) | Particle Size (microns) | Temperature (°F.) | Circulation Rate (gal. per min.) |
|---|---|---|---|
| Start | 80 | 115 | 30 |
| 5 | 40 | 142 | 30 |
| 10 | 25 | 154 | 30 |

The results observed in Example XIX were thus verified. In addition, the increased speed of processing with the use of a substantially unrestricted retaining screen was shown by comparison with Example XIX.

For purposes of illustration of the advantages of the present invention, the production capacities and power consumption of various commercially used chocolate processing units were compared with a production size unit of the present invention. Specifically, a circulation agitated-media mill of the present invention with a 25 gallon comminuting vessel was compared with standard three-roll or five-roll refiners with a continuous agitated-media mill of 40 gallon capacity, with a triple Carborundum mill as described in "Chocolate Production and Use" by L. Russell Cook (1963) and/or with the Weiner process including a 100 gallon continuous agitated-media mill. Although these are not actual experiments, they are sound projections based on processing experience with the comparable commercially available units as well as the enumerated examples with the circulation agitated-media mill. The results are shown in Tables XX and XXI below.

TABLE XX

CHOCOLATE AND COMPOUND COATING GRINDING (REFINING)

| Particular Size range | Five-Roll Refiner 75 Hp. | Wiener Process (100-S Attritor) 30Hp. | Present Process (25 gal. comminuting vessel) 30Hp. |
|---|---|---|---|
| 30–40 microns | 1000 lbs./hr. | 450 lbs./hr. | 1800 lbs./hr. |
| 20–30 microns | 750 lbs./hr. | 360 lbs./hr. | 1200 lbs./hr. |
| 10–20 microns | 580 lbs./hr. | 260 lbs./hr. | 800 lbs./hr. |

TABLE XXI

CHOCOLATE LIQUOR GRINDING (REFINING) (Preground to 200 to 250 microns)

| Particle Size range | Three-Roll Refiner 40Hp. | Continuous Agitated Media Mill (40 gallon capacity) 40Hp. | Present Process (25 gallon comminuting vessel) 30Hp. |
|---|---|---|---|
| 30–40 microns | 1000 lbs./hr. | 1400 lbs./hr. | 2000 lbs./hr. |
| 20–30 microns | 600 lbs./hr. | 800 lbs./hr. | 1500 lbs./hr. |
| 10–20 microns | not possible | not possible | 1000 lbs./hr. |

| | Triple Carborundum Mill 60Hp. | Continuous Agitated Media Mill (40 gal. cap.) and Wiener process (100 gal. cap.) combined 65Hp. | Present Process (25 gal. comminuting vessel) 30 Hp. |
|---|---|---|---|
| 10–20 microns | 600 lbs./hr. | 650 lbs./hr. | 1000 lbs./hr. |

Tables XX and XXI show in a very graphic way the increased production with the present process, with less horsepower and power consumption. Also, the chocolate nibs need not be ground in an impact process, such as a hammer mill, to as fine a particle size before refining, which further adds to the reduction in processing costs.

Moreover, the product produced has better taste and texture with improved viscosity control. This is not only because conching takes place during processing with liberation of acetic acid and moisture, but also because of greater particle uniformity and improved particle fineness.

The reason for the surprising result of the present invention is not entirely understood. One explanation is that the relatively high streaming speed results in laminar flow through the comminuting means, which results in the substantial reduction in turbulence and recirculation of the liquid containing solids within the comminuting means. If such is so, the whole batch of liquid containing solids is convectively circulated through the comminuting means and processed as if the batch was totally within the comminuting means.

The more plausible explanation, however, seems to be that of a "dynamic sieve". This explanation can best be illustrated by reference to FIG. 5. The retaining screens 13A and 13B, respectively, of the comminuting means 2 are shown. In between is shown grinding element 12 in an agitated condition, with the screens restricting the movement and maintaining the density of the grinding elements. For purposes of illustration, the paths of a large chocolate particle 130 and a small chocolate particle 131 through the agitated grinding elements are shown by arrows 132 and 133, respectively.

Figure 5:
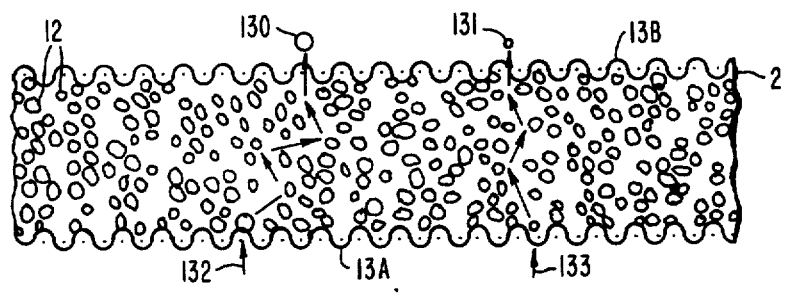
FIG. 5 is a schematic illustration of a proposed theory of operation of the present invention.

As shown by FIG. 5, the interstices between the agitated grinding elements 12 act as a constantly changing kinetic sieve. The large chocolate particle 130 has a higher probability of collisions with the grinding elements 12 than the small chocolate particle 131 and thus travels a longer path through the bed of agitated grinding elements 12 than the smaller chocolate particle 131. The grinding time for the larger chocolate particles is in turn larger than the grinding time for the smaller chocolate particles. The larger chocolate particles are therefore ground at a higher rate than the smaller chocolate particles.

It should be emphasized that this is only one explanation. It may be that the proper explanation is a combination of the laminar flow and the dynamic sieve explanations. Irrespective of the theory, however, it remains that the present invention gives totally unexpected results than what was heretofore logically projected from a knowledge of the art.

While presently preferred embodiments have been shown and described with particularly, it is distinctly understood that the invention may be otherwise variously performed and embodied within the scope of the following claims.

What is claimed is:

1. A method of making chocolate and chocolate flavored compounds comprising the steps of:
   A. providing a liquid continuum containing suspended chocolate solids to be ground in a pumpable mass;
   B. providing a comminuting means in which a bed of comminuting elements in a confining vessel are agitated by a rotating shaft having protuberances extending therefrom;
   C. repeatedly circulating the liquid continuum containing suspended chocolate solids sequentially through a pump means and the comminuting means at a streaming speed of at least 30 volumes of liquid continuum containing solids in the comminuting means per hour, said volume being the liquid dispersion capacity of the confining vessel;

D. comminuting said chocolate solids in the comminuting means as the liquid continuum containing chocolate solids steadily passes through the comminuting means; and E. continuing steps C and D until the chocolate solids in the liquid continuum are reduced to desired particle size.

2. A method of making chocolate and chocolate flavored compounds as set forth in claim 1 wherein:

the liquid continuum containing chocolate solids is circulated through the pump means and comminuting means at a streaming speed between 50 and 500 volumes of liquid continuum containing solids in the comminuting means per hour.

3. A method of making chocolate and chocolate flavored compounds as set forth in claim 1 wherein:

the step of providing the comminuting means includes filling the confining vessel with grinding elements to a level such that less than about 15% of the volume of the confining vessel is free space apart from above the grinding elements in the unagitated state.

4. A method of making chocolate and chocolate flavored compounds as set forth in claim 3 wherein:

the liquid continuum containing suspended chocolate solids is circulated through the pump means and comminuting means at a streaming speed between 50 and 500 volumes of liquid continuum containing solids in the comminuting means per hour.

5. A method of making chocolate and chocolate flavored compounds as set forth in claim 1 wherein:

step C is accomplished by passing the liquid continuum containing chocolate solids substantially upwardly through the bed of agitated grinding elements.

6. A method of making chocolate and chocolate flavored compounds as set forth in claim 5 wherein:

the vertical progress of the liquid continuum containing chocolate solids through the comminuting means is at least 2 mm per second.

7. A method of making chocolate and chocolate flavored compounds as set forth in claim 6 wherein:

the vertical progress is at least 5 mm pe second.

8. A method of making chocolate and chocolate flavored compounds as set forth in claim 1 wherein step C includes:

discharging the liquid continuum containing chocolate solids from the comminuting means through a retaining screen in a substantially unrestricted flow.

9. A method of making chocolate and chocolate flavored compounds as set forth in claim 8 wherein:

the step of providing the comminuting means includes filling the confining vessel with grinding elements to a level such that less than about 15% of the volume of the confining vessel is free space apart from above the grinding elements in the unagitated state.

10. A method of making chocolate and chocolate as set forth in claim 9 wherein:

the liquid continuum containing chocolate solids is circulated through the pump means and comminuting means at a streaming speed between 50 and 500 volumes of liquid continuum containing solids in the comminuting means per hour.

11. A method of making chocolate and chocolate flavored compounds comprising the steps of:

A. providing a liquid continuum containing suspended chocolate solids to be ground in a pumpable mass in a retaining-chamber;

B. providing a comminuting means in which a bed of comminuting elements in a confining vessel are agitated by a rotating shaft having protuberances extending therefrom;

C. circulating the liquid continuum containing chocolate solids from the retaining chamber into the comminuting means through one end thereof at a streaming speed of at least 30 volumes of liquid continuum containing solids in the comminuting means per hour said volume being the liquid dispersion capacity of the confining vessel;

D. comminuting said chocolate solids in the comminuting means as the liquid continuum containing solids steadily passes through the comminuting means;

E. discharging the liquid continuum containing suspended chocolate solids from the comminuting means into the retaining chamber at a streaming speed of at least said 30 volumes of liquid continuum containing solids in the comminuting means per hour, said liquid continuum containing suspended chocolate solids being discharged from an end of the comminuting means that is substantially opposite the end of the comminuting means through which the liquid continuum containing chocolate solids is circulated to the comminuting means; and F. simultaneously continuing steps C through E until the chocolate solids in the liquid continuum are reduced to desired particle size.

12. A method of making chocolate and chocolate flavored compounds as set forth in claim 11 wherein;

the liquid continuum containing suspended chocolate solids is circulated to the comminuting means at a streaming speed between 50 and 500 volumes of liquid continuum containing solids in the comminuting means per hour.

13. A method of making chocolate and chocolate flavored compounds as set forth in claim 11 wherein:

the step of providing the comminuting means includes filling the confining vessel with grinding elements to a level such that less than about 15% of the volume of the confining vessel is free space apart from above the grinding elements in the unagitated state.

14. A method of making chocolate and chocolate flavored compounds as set forth in claim 13 wherein:

the liquid continuum containing suspended chocolate solids is circulated to the comminuting means at a streaming speed between 50 and 500 volumes of liquid continuum containing suspended solids in the comminuting means per hour.

15. A method of making chocolate and chocolate flavored compounds as set forth in claim 13 wherein:

step D is accomplished by passing the liquid continuum containing chocolate solids substantially upwardly through the bed of agitated grinding elements.

16. A method of making chocolate and chocolate flavored compounds as set forth in claim 15 wherein:

the vertical progress of the liquid continuum containing chocolate solids through the comminuting means is at least 2 mm per second.

17. A method of making chocolate and chocolate flavored compounds as set forth in claim 16 wherein:
the vertical progress is at least 5 mm per second.

18. A method of making chocolate and chocolate flavored compounds as set forth in claim 11 wherein step E includes:
discharging the liquid continuum containing chocolate solids from the comminuting means through a retaining screen in a substantially unrestricted flow.

19. A method of making chocolate and chocolate flavored compounds as set forth in claim 18 wherein:
the step of providing the comminuting means includes filling the confining vessel with grinding elements to a level such that less than above 15% of the volume of the confining vessel is free space apart from above the grinding elements in the unagitated state.

20. A method of making chocolate and chocolate flavored compounds as set forth in claim 18 wherein:
the liquid continuum containing chocolate solids is circulated through the pump means and comminuting means at a streaming speed between 50 and 500 volumes of liquid continuum containing solids in the comminuting means per hour.

21. A method of making chocolate and chocolate flavored compounds comprising the steps of:
A. providing a liquid continuum of chocolate solids to be ground suspended in a pumpable mass in a first retaining chamber;
B. providing a comminuting means in which a bed of comminuting elements in a confining vessel are agitated by a rotating shaft having protuberances extending therefrom;
C. circulating the liquid continuum containing suspended chocolate solids from the first retaining chamber into the comminuting means through one end thereof at a streaming speed of at least 30 volumes of the comminuting means per hour, said volume being the liquid dispersion capacity of the confining vessel;
D. comminuting said chocolate solids in the comminuting means as the circulated liquid continuum containing solids steadily passes through the comminuting means;
E. discharging the liquid continuum containing suspended chocolate solids from the comminuting means into a second retaining chamber at a streaming speed of at least said 30 volumes of liquid continuum containing solids in the comminuting means per hour until a substantial volume of liquid continuum is provided in the second retaining chamber, said liquid continuum containing suspended chocolate solids being discharged from an end of the comminuting means that is substantially opposite the end of the comminuting means through which the liquid continuum containing chocolate solids is circulated to the comminuting means;
F. thereafter recirculating the liquid continuum containing chocolate solids from the second retaining chamber into the comminuting means through one end thereof at a rate of at least said 30 volumes of the liquid continuum containing solids in the comminuting means per hour;
G. comminuting said chocolate solids in the comminuting means as the recirculated liquid continuum steadily passes through the comminuting means;
H. discharging the liquid continuum containing chocolate solids from the comminuting means into a third retaining chamber at a streaming speed of at least said 30 volumes of liquid continuum containing solids in the comminuting means per hour until a substantial volume of liquid continuum is provided in the third retaining chamber, said liquid continuum containing suspended chocolate solids being discharged from an end of the comminuting means that is substantially opposite the end of the comminuting means through which the liquid continuum containing chocolate solids is recirculated to the comminuting means; and
I. repeating steps B through H until the chocolate solids in the liquid continuum are reduced to desired particle size.

22. A method of making chocolate and chocolate flavored compounds as set forth in claim 21 wherein:
the step of forming the comminuting means includes filling the confining vessel with grinding elements to a level such that less than about 15% of the volume of the confining vessel is free space apart from above the grounding elements in the unagitated state.

23. A method of making chocolate and chocolate flavored compounds as set forth in claim 22 wherein:
the liquid continuum containing chocolate solids is circulated through the pump means and comminuting means at a streaming speed between 50 and 500 volumes of liquid continuum containing solids in the comminuting means per hour.

24. A method of making chocolate and chocolate flavored compounds as set forth in claim 23 wherein:
steps D and G are accomplished by passing the liquid continuum containing chocolate solids substantially upwardly through the bed of agitated grinding elements.

25. A method of making chocolate and chocolate flavored compounds as set forth in claim 21 wherein:
step I is performed automatically.

26. A method of making chocolate and chocolate flavored compounds as set forth in claim 21 wherein steps E and H include:
discharging the liquid continuum containing solids from the comminuting means through a retaining screen in a substantially unrestricted flow.

27. A method of making chocolate and chocolate flavored compounds as set forth in claim 26 wherein:
the step of forming the comminuting means includes filling the confining vessel with grinding elements to a level such that less than about 15% of the volume of the comminuting vessel is free space apart from above the grinding elements in the unagitated state.

28. A method of making chocolate and chocolate flavored compounds as set forth in claim 27 wherein:
the liquid continuum containing chocolate solids is circulated through the pump means and comminuting means at a streaming speed between 50 and 500 volumes of liquid continuum containing solids in the comminuting means per hour.

29. A method of making chocolate and chocolate flavored compounds as set forth in claim 27 wherein:
steps D and G are accomplished by passing the liquid continuum containing chocolate solids substantially upwardly through a bed of agitated grinding elements.

30. A method of making chocolate liquor comprising the steps of:
  A. providing a pumpable mass of chocolate liquor;
  B. repeatedly circulating the chocolate liquor mass through a pump means and a comminuting means in which a bed of comminuting elements in a confining vessel are agitated by a rotating shaft having protuberances extending therefrom, said chocolate liquor being repeatedly circulated at a streaming speed of at least 30 volumes of chocolate liquor in the comminuting means per hour, said volume being the liquid dispersion capacity of the confining vessel;
  C. comminuting the chocolate liquor in the comminuting means as said liquor steadily passes therethrough; and
  D. continuing steps B and C until the solids in the chocolate liquor are reduced to desired particle size.

31. A method of making chocolate liquor as set forth in claim 30 comprising in addition:
  adding cocoa nibs to the chocolate liquor mass before and/or during performance of steps B and C.

32. A method of making sweet chocolate comprising the steps of:
  A. providing a pumpable mass including chocolate liquor and sugar;
  B. repeatedly circulating the chocolate liquor and sugar through a pump means and a comminuting means in which a bed of comminuting elements in a confining vessel are agitated by a rotating shaft having protuberances extending therefrom, said chocolate liquor and sugar being repeatedly circulated at a streaming speed of at least 30 volumes of chocolate liquor and sugar in the comminuting means per hour, said volume being the liquid dispersion capacity of the confining vessel;
  C. comminuting the chocolate liquor and sugar in the comminuting means as the chocolate liquor and sugar steadily pass therethrough; and
  D. continuing steps B and C until the solids in the chocolate liquor and sugar are reduced to desired particle size.

33. A method of making sweet chocolate as set forth in claim 32 comprising in addition:
  adding cocoa nibs to the mass of chocolate liquor and sugar before and/or during performance of steps B and C.

34. A method of making sweet chocolate as set forth in claim 32 comprising in addition:
  adding sugar or chocolate liquor to the mass of chocolate liquor and sugar during performance of steps B and C.

35. A method of making cocoa powder comprising the steps of:
  A. providing a pumpable mass of chocolate liquor;
  B. repeatedly circulating the chocolate liquor through a pump means and a comminuting means in which a bed of comminuting elements in a confining vessel are agitated by a rotating shaft having protuberances extending therefrom, said chocolate liquor being repeatedly circulated at a streaming speed of at least 30 volumes of liquid continuum containing solids in the comminuting means per hour, said volume being the liquid dispersion capacity of the confining vessel;
  C. comminuting the chocolate liquor in the comminuting means, said liquor steadily passing through the comminuting means;
  D. continuing steps B and C until the solids in the chocolate liquor mass are reduced to desired particle size and a desired amount of cocoa butter is freed from the solids; and
  E. separating substantial amounts of cocoa butter from the chocolate liquor to form a cocoa powder.

36. A method of making cocoa powder as set forth in claim 35 comprising in addition:
  adding cocoa nibs to the chocolate liquor mass before and/or during performance of steps B and C.

37. A method of making chocolate and chocolate flavored materials comprising the steps of:
  A. providing a composition selected from the group consisting of chocolate and chocolate-like materials, said composition having an undesirable component that vaporizes at a lower temperature than a desirable component;
  B. providing a liquid continuum including said composition in a pumpable mass in a retaining chamber;
  C. providing a comminuting means in which a bed of comminuting elements in a confining vessel are agitated by a rotating shaft having protuberances extending therefrom;
  D. circulating said composition from the retaining chamber through the comminuting means at a rate of at least 30 volumes of liquid continuum containing solids in the comminuting means per hour, said volume being the liquid dispersion capacity of the confining vessel, such that, combined with heating or cooling of at least the retaining chamber or comminuting means, the temperature of the composition is maintained at a desired temperature where the undesirable component is substantially vaporized and at least partially eliminated from said composition while the desirable component remains substantially unvaporized and retained in said composition; and
  E. continuing step D until a desired quality is attained in said composition.

38. A method of making chocolate and chocolate flavored materials as set forth in claim 37 wherein:
  said composition is chocolate liquor prepared from flavor bean nibs, and the temperature is maintained during steps D and E and E below about 140° F.

39. A method of making chocolate and chocolate flavored materials as set forth in claim 38 wherein:
  the temperature is maintained during steps D and E above about 110° F.

40. A method of making chocolate and chocolate flavored materials as set forth in claim 37 wherein:
  said composition is chocolate liquor prepared from filler bean nibs, and the temperature is maintained during steps D and E below about 230° F.

41. A method of making chocolate and chocolate flavored materials as set forth in claim 40 wherein:
  the temperature is maintained during steps D and E above about 110° F.

42. A method of making chocolate and chocolate flavored materials as set forth in claim 37 wherein:
  said composition is a semi-sweet chocolate, and the temperature is maintained during steps D and E between 110° and 200° F.

43. A method of making chocolate and chocolate flavored materials as set forth in claim 42 wherein:

said semi-sweet chocolate composition is prepared using flavor bean nibs, and the temperature is maintained during ssteps D and E between 120° and 140° F.

44. A method of making chocolate and chocolate flavored materials as set forth in claim 42 wherein:
said semi-sweet chocolate composition is prepared using filler bean nibs, and the temperature is maintained during steps D and E between 150° and 180° F.

45. A method of making chocolate and chocolate flavored materials as set forth in claim 37 wherein:
said composition comprises a combination of milk powder, cocoa powder, vegetable fat and sugar, and the temperature is maintained during steps D and E between 110° and 125° F.

46. A method of making chocolate and chocolate flavored materials as set forth in claim 37 wherein:
said composition comprises a combination of milk powder, cocoa powder, vegetable fat and artificial sweetner, and the temperature is maintained during steps D and E between 100° and 125° F.

47. A method of making chocolate and chocolate flavored materials as set forth in claim 37 wherein:
said composition comprises a combination of cocoa butter, milk powder, and chocolate liquor, and the temperature is maintained during steps D and E between 110° and 125° F.

48. A method of making chocolate and chocolate flavored compounds comprising the steps of:
A. providing a liquid continuum of chocolate solids to be ground suspended in a pumpable mass in a first retaining chamber;
B. providing a comminuting means in which a bed of comminuting elements in a confining vessel are agitated by a rotating shaft having protuberances extending therefrom;
C. circulating the liquid continuum containing suspended chocolate solids from the first retaining chamber into the comminuting means through one end thereof at a streaming speed of at least 30 volumes of liquid continuum containing solids in the comminuting means per hour, said volume being the liquid dispersion capacity of the confining vessel;
D. comminuting said chocolate solids in the comminuting means as the circulated liquid continuum containing solids steadily passes through the comminuting means;
E. discharging the liquid continuum containing suspended chocolate solids from the comminuting means into a second retaining chamber at a streaming speed of at least said 30 volumes of liquid continuum containing solids in the comminuting means per hour until a substantial volume of liquid continuum is provided in the second retaining chamber, said liquid continuum containing suspended chocolate solids being discharged from an end of the comminuting means that is substantially opposite the end of the comminuting means through which the liquid continujm containing chocolate solids is circulated to comminuting means;
F. thereafter recirculating the liquid continuum containing chocolate solids from the second retaining chamber into the comminuting means through one end thereof at a rate of at least said 30 volumes of the liquid continuum containing solids in the comminuting means per hour;
G. comminuting said chocolate solids in the comminuting means as the recirculated liquid continuum steadily passes through the comminuting means;
H. discharging the liquid continuum containing chocolate solids from the comminuting means into said first retaining chamber at a streaming speed of at least said 30 volumes of liquid continuum containing solids in the comminuting means per hour until a substantial volume of liquid continuum is provided in the first retaining chamber, said liquid continuum containing suspended chocolate solids being discharged from an end of the comminuting means that is substantially opposite the end of the comminuting means through which the liquid continuum containing chocolate solids is recirculated to the comminuting means; and
I. repeating steps B through H until the chocolate solids in the liquid continuum are reduced to desired particle size.

* * * * *